United States Patent [19]

Rizzo

[11] Patent Number: 5,516,084
[45] Date of Patent: May 14, 1996

[54] HYDRAULIC ENGINE MOUNT WITH DIAPHRAGM DECOUPLER

[75] Inventor: Michael C. Rizzo, Kettering, Ohio

[73] Assignee: General Motors Corporation, Detroit, Mich.

[21] Appl. No.: 422,283

[22] Filed: Apr. 14, 1995

[51] Int. Cl.[6] .................................................. F16M 1/00
[52] U.S. Cl. .................................. 267/140.13; 267/219
[58] Field of Search ........................... 267/122, 140.12, 267/140.13, 140.4, 141.2, 141.6, 219; 248/562, 566

[56] References Cited

U.S. PATENT DOCUMENTS

| 4,721,292 | 1/1988 | Saito | 267/140.13 |
| 4,773,634 | 9/1988 | Hamaekers | 248/562 |
| 4,925,162 | 5/1990 | Kojima | 267/140.13 |
| 5,088,700 | 2/1992 | Kanda et al. | 267/140.13 |

FOREIGN PATENT DOCUMENTS

| 0188638 | 9/1985 | Japan | 267/140.13 |
| 03288036 | 12/1991 | Japan | 267/140.13 |
| 6-123330 | 5/1994 | Japan | 267/140.13 |

Primary Examiner—David M. Mitchell
Assistant Examiner—Chris Schwartz
Attorney, Agent, or Firm—Jeffrey A. Sedlar

[57] ABSTRACT

In a hydraulic mount the use of a diaphragm decoupler between the partition's upper and lower orifice plates substantially eliminates inertia track leakage and substantially eliminates chortle noise.

5 Claims, 2 Drawing Sheets

HYDRAULIC ENGINE MOUNT WITH DIAPHRAGM DECOUPLER

BACKGROUND OF THE INVENTION

The present invention relates to hydraulic mounts for damping vibrations.

A variety of mount assemblies are presently available to isolate vibrations. One conventional mount commonly employed to reduce vehicular vibrations is the hydraulic mount.

Conventional hydraulic mounts provide relatively low-damping, vibration-isolating characteristics (low dynamic rigidity), at vibrations of low amplitudes and high frequencies such as those generated by a running engine. These mounts also provide substantially increased-damping characteristics (high dynamic rigidity) at vibrations of high amplitudes and low frequencies such as those generated by running a vehicle on bumpy inconsistent road surfaces.

A hydraulic mount assembly of prior invention includes a reinforced, hollow rubber body that is closed by a resilient chamber diaphragm so as to form a cavity. This cavity is partitioned by a pair of mating plates into two chambers that are in fluid communication with each other through a relatively large primary orifice in the partition. A primary chamber is formed between the partition and the hollow rubber body. A secondary chamber is formed between the partition and the chamber diaphragm.

A decoupler is positioned in the partition's primary orifice and reciprocates in response to vibrations so as to produce small volume changes in the two chambers. When the decoupler is moved toward the chamber diaphragm, it exactly compensates for the volume lost due to the compression of the primary chamber. The compensated volume is transferred to the secondary chamber by the displacement of the decoupler and then is accommodated by expansion of the chamber diaphragm. In this way, at certain low vibratory amplitudes the major fluid flow displaces the decoupler so that the mount exhibits low dynamic rigidity to isolate engine vibrations and hydraulic damping is not provided.

In addition to the primary orifice, a smaller inertia track provides an orifice which extends around the perimeter of the partition so as to have a large length-to-diameter ratio. Each end of the inertia track has an opening; one opening communicates with the primary chamber and the other with the secondary chamber. The inertia track provides the hydraulic mount assembly with a means of providing hydraulic damping for high dynamic rigidity at high amplitude vibrations where the volume lost due to the compression of the primary chamber exceeds the capacity of the decoupler's compensation. When combined, the oscillating decoupler and the inertia track provide at least two distinct dynamic modes of operation. The operating mode is primarily determined by the flow or lack of flow of fluid between the two chambers through the inertia track.

More specifically, small amplitude vibrating inputs, such as from the engine or the like, are isolated by the mount which exhibits low dynamic rigidity due to decoupling wherein, the decoupler reciprocates, compensating for volume losses, thereby preventing fluid motion in the inertia track, as described above. On the other hand, large amplitude vibrating inputs force the decoupler against either mating plate stopping volume compensation to produce fluid flow through the inertia track resulting in a high level of vibration damping force and high dynamic rigidity. In each instance, as the decoupler moves from one seated position to another, a relatively limited amount of fluid can bypass the inertia track by moving around the sides of the decoupler.

Conventionally decoupled hydraulic mounts have certain drawbacks. When the free decoupler closes against one of the partition's plates, noise referred to as "chortle" or "loose lumber" is created. Additionally, leakage between the partition's plates from the inertia track effects the low amplitude damping performance of the mount. This leakage is also a major source of part-to-part damping variation.

SUMMARY OF THE INVENTION

The present invention presents a hydraulic mount having a pair of mounting members connected together and forming an internal cavity. The cavity is separated into two chambers by a partition. The partition includes mating first and second plates, each having a primary orifice area providing a flow path through the respective plate and together, cooperating to form an inertia track providing a flow path through the partition.

A compliant diaphragm is captured between the first and second plates sealing the length of the inertia track and extending between the two plates and across the primary orifice area. Preferably, the diaphragm is secured to one of the plates by an adhesive, except in the primary orifice area.

The diaphragm integrally provides a leak proof seal along the length of the inertia track and operates to provide a means of decoupling. By substantially eliminating inertia track and decoupler leakage, it has been found that low amplitude damping is improved by as much as fifty percent. Additionally, product quality is improved since the conventional leakage, which varies from part to part and the related varying damping performance is eliminated. A further advantage is realized because the conventional type free floating decoupler is eliminated and replaced by a soft, light and compliant diaphragm. Rather than impacting the partition's plates the diaphragm stretches to fill a pocket in one of the plates, without generating the conventionally produced chortle noise.

Reduced mass of the decoupling mechanism improves high frequency tuning of the mount by allowing the spring rate to remain low at significantly higher frequencies. Elimination of the free decoupler also simplifies assembly of the partition.

DETAILED DESCRIPTION OF THE PRESENTLY PREFERRED EMBODIMENT

Figure 1:
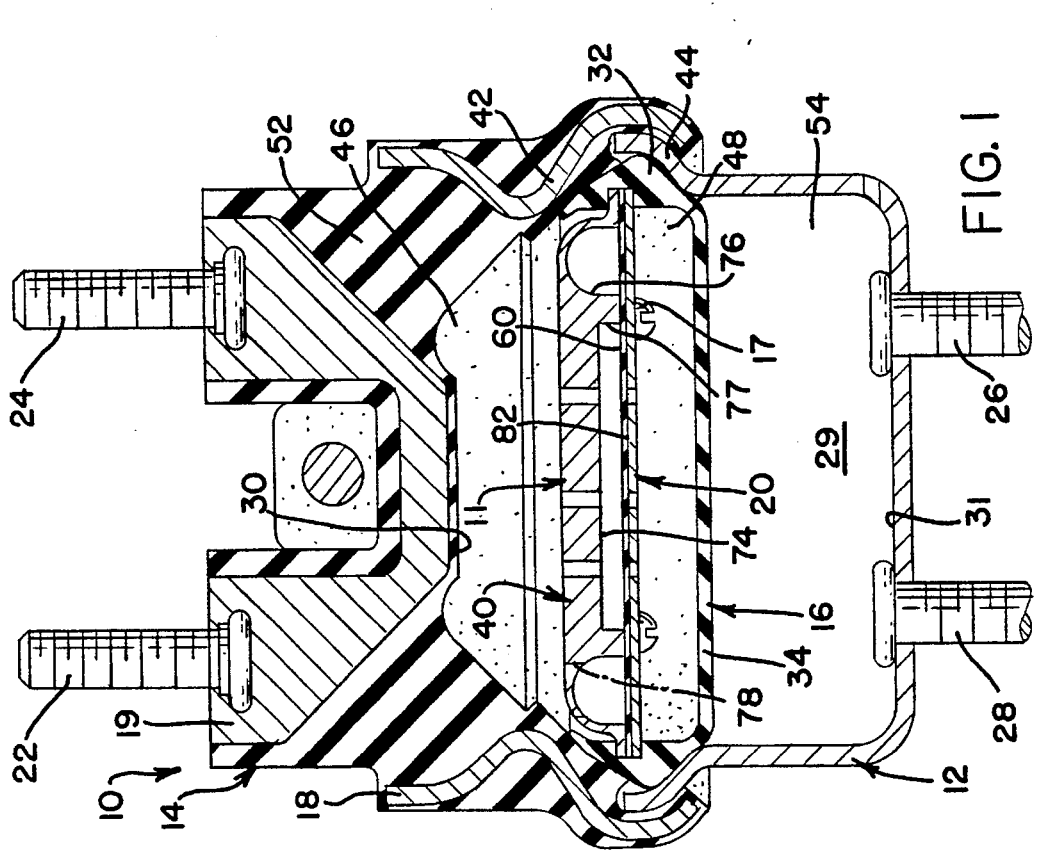
FIG. 1 is a sectional view of an engine mount according to the present invention.

Referring to the drawings, illustrated in FIG. 1 is a hydraulic mount 10 incorporating a partition assembly 11. Mount 10 includes molding assembly 14 which is comprised of an elastomeric such as natural or synthetic rubber and includes inserts 18 and 19. Molding assembly 14 includes fasteners 22 and 24 which serve as mounting points wherein molding assembly 14 provides a mounting member for the mount 10. Molding assembly 14 is adapted for crimped assembly onto base plate 12 which provides a second mounting member for mount 10. Base plate 12 includes two fasteners 26 and 28 for mounting purposes.

The molding assembly 14 and the base plate 12 are configured such that they essentially completely define a hollow cavity 29 between walls 30 and 31, in which chamber diaphragm 16 engages molding assembly 14 and spans across cavity 29. The chamber diaphragm 16 is formed of an elastomeric such as natural or synthetic rubber and has rim portion 32 and a spanning central portion 34. The rim portion 32 is flexible to receive the periphery of the partition assembly 11 which includes upper orifice plate 40, diaphragm 60 and lower orifice plate 20. Partition assembly 11 is held together by four fasteners, representative of which is fastener 17. During assembly, the periphery of the partition assembly 11 is sandwiched between the flange 42 of the molding assembly 14 and the flange 44 of base plate 12. Flanges 42 and 44 are subsequently crimped together to secure the assembly.

When the mount 10 is assembled, cavity 29 is divided by the partition assembly 11 into two chambers 46 and 48. The chamber diaphragm 16 separates chamber 48 from space 54. Primary chamber 46 is enclosed between the molding assembly 14 and the partition assembly 11. Secondary chamber 48 is enclosed between the chamber diaphragm 16 and the partition assembly 11. Prior to closure of the cavity 29 at assembly, the primary and secondary chambers 46 and 48 are filled with a liquid (not illustrated), such as commercial engine anti-freeze coolant. Chamber diaphragm 16 prevents fluid leakage from chambers 46 and 48 to the space 54.

Figure 2:
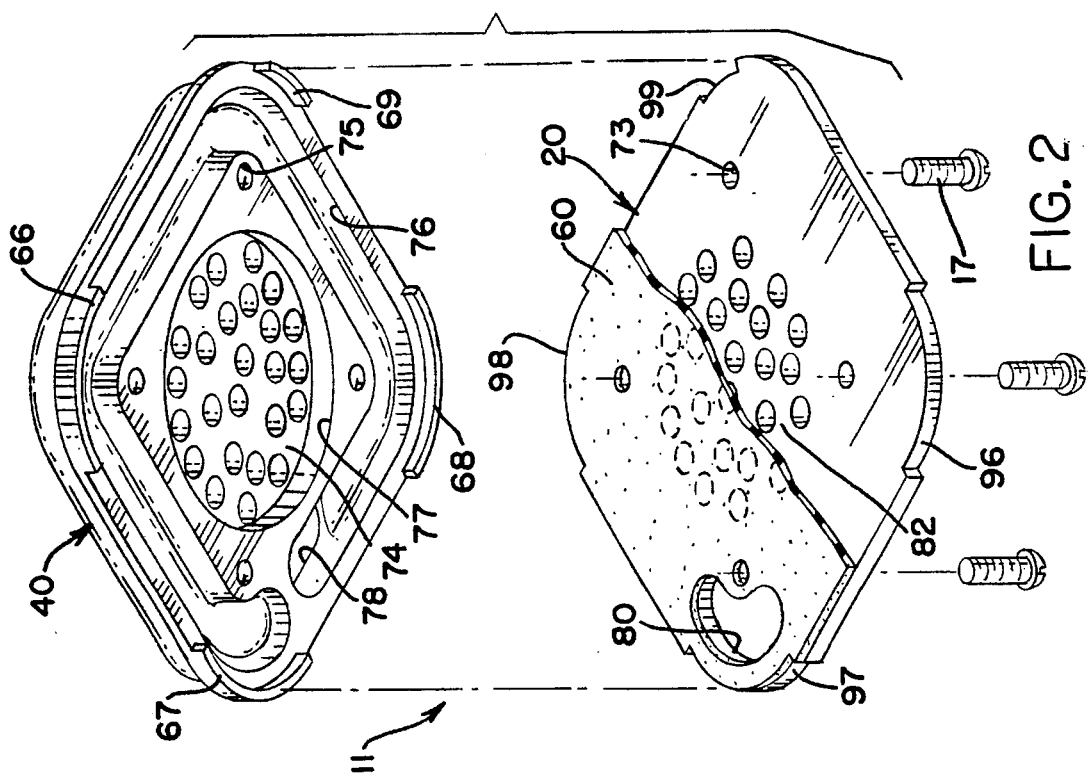
FIG. 2 is an exploded detail illustration of a partition.

Referring to FIG. 2, the partition assembly 11 includes upper orifice plate 40 which exhibits a substantially open primary orifice area 74 comprised of twenty-five 5 mm diameter openings and an inertia track 76 which extends around the perimeter of the upper orifice plate 40. The primary orifice area 74 substantially provides a screened over means of retaining diaphragm 60. The inertia track 76 includes port 78 which permits flow between the inertia track 76 and the primary chamber 46. A disk-shaped pocket 77 is formed about the primary orifice area 74. Four fastener holes, represented by hole 75, are positioned around the outer perimeter of pocket 77. Upper orifice plate 40 includes four tabs 66–69 around its lower perimeter, tab 69 being substantially smaller than tabs 66–68.

Partition assembly 11 includes lower orifice plate 20 which is adapted to mate with upper orifice plate 40 and functions to enclose the length of inertia track 76. Lower orifice plate 20 is conventionally formed from rigid material, preferably steel.

Lower orifice plate 20 includes port 80 which provides an inlet and outlet between inertia track 76 and secondary chamber 48. Lower orifice plate 20 includes a primary orifice area 82 comprised of twenty-five 5 mm diameter openings. The primary orifice area 82 substantially provides a screened over means of retaining diaphragm 60. Lower orifice plate 20 includes four fastener openings, represented by opening 73.

Adapted to be captured between upper orifice plate 40 and lower orifice plate 20 is diaphragm 60. The contour of diaphragm 60 matches that of lower orifice plate 20. Port 80 extends through diaphragm 60. Diaphragm 60 is made of natural or synthetic rubber and is fastened by a conventional adhesive to lower orifice plate 20 except in the primary orifice area 82. Pocket 77 provides an expansion cavity for diaphragm 60 and is open to primary chamber 46 through the primary orifice area 74 of upper orifice plate 40. Diaphragm 60 presents a movable barrier to secondary chamber 48 through the primary orifice area 82 of lower orifice plate 20.

Lower orifice plate 20 includes four notches 96–99 for mating with the tabs 66–69 of upper orifice plate 40. Notch 99 is substantially smaller than notches 96–98 to mate only with tab 69 thereby, serving as a means of orienting the two plates during assembly. This ensures port 80 is positioned at the correct location along inertia track 76.

Liquid in the primary chamber 46 is forced to flow through primary orifice area 74 into pocket 77 or through inertia track 76 into the secondary chamber 48 upon compression of the primary chamber 46 and in the opposite direction on expansion thereof to provide a damping effect. Upon compression of the primary chamber 46, the wall section 52 is initially caused to bulge outwardly while the liquid therein is subsequently forced to flow into pocket 77 or into the chamber 48 to expand the latter as permitted by the elasticity of the chamber diaphragm's central spanning portion 34. Upon a reversal in displacement and the resultant expansion of the primary chamber 46, the stretched central spanning portion 34 self retracts and thereby contracts secondary chamber 48 forcing the liquid to flow back through the orifice track 76 into the primary chamber 46 or to expand diaphragm 60 into pocket 77 to complete a cycle. To assure free expansion and contraction of the secondary chamber 48, the space 54 between the diaphragm 16 and the base plate 12 is vented to atmosphere.

Limited volume exchange in the chambers 46 and 48 to effect hydraulic decoupling (elimination of the hydraulic damping and hydraulic spring rate) below a prescribed low amplitude, generally at high frequencies, is provided by resilient movement of the diaphragm 60 in response to alternating pressure buildups in the mount 10 acting on the opposite sides of the partition assembly 11. The diaphragm 60 provides a means of limiting volume exchange by moving against lower orifice plate 20 or expanding to fill pocket 77 of upper orifice plate 40 to prevent volume exchange between the primary chamber 46 and the secondary chamber 48 through the primary orifice area 74 and 82 when the compression of the primary chamber is significant.

In operation, as the mount 10 deflects and the amplitude of the displacement is relatively small, fluid flows back and forth through the primary orifice areas 74 and 82 with very little restriction as the diaphragm 60 expands and contracts in the pocket 77. This occurs even though diaphragm 60 is adhered to lower orifice plate 20 outside the primary orifice area 82. The dynamic rigidity of the mount 10 is low under this condition. Therefore, for certain small vibratory amplitudes which occur at generally higher frequencies, the diaphragm 60 freely permits fluid movement between chamber 46 and pocket 77 and between chamber 48 and pocket 77 providing a mount 10 with low dynamic rigidity and high vibration isolation.

For larger mount displacements caused by high amplitude vibrations, the fluid flow forces the diaphragm 60 to move far enough to bottom out on either orifice plate 20 or 40. When the diaphragm 60 bottoms out the compression of either the primary or secondary chamber can no longer be compensated by volume exchange and fluid flow is forced to move through the inertia track 76. This results in a large increase in the mount's dynamic rigidity. Hydraulic damping is thereby provided for high vibratory amplitudes at low frequencies.

As the mount 10 is cycled at large displacements, the chortle noise that had been conventionally produced thereby is minimized. Concurrently, the substantial elimination of leakage associated with a conventional free-floating decoupler and from the inertia track improves low amplitude damping.

Figure 3:
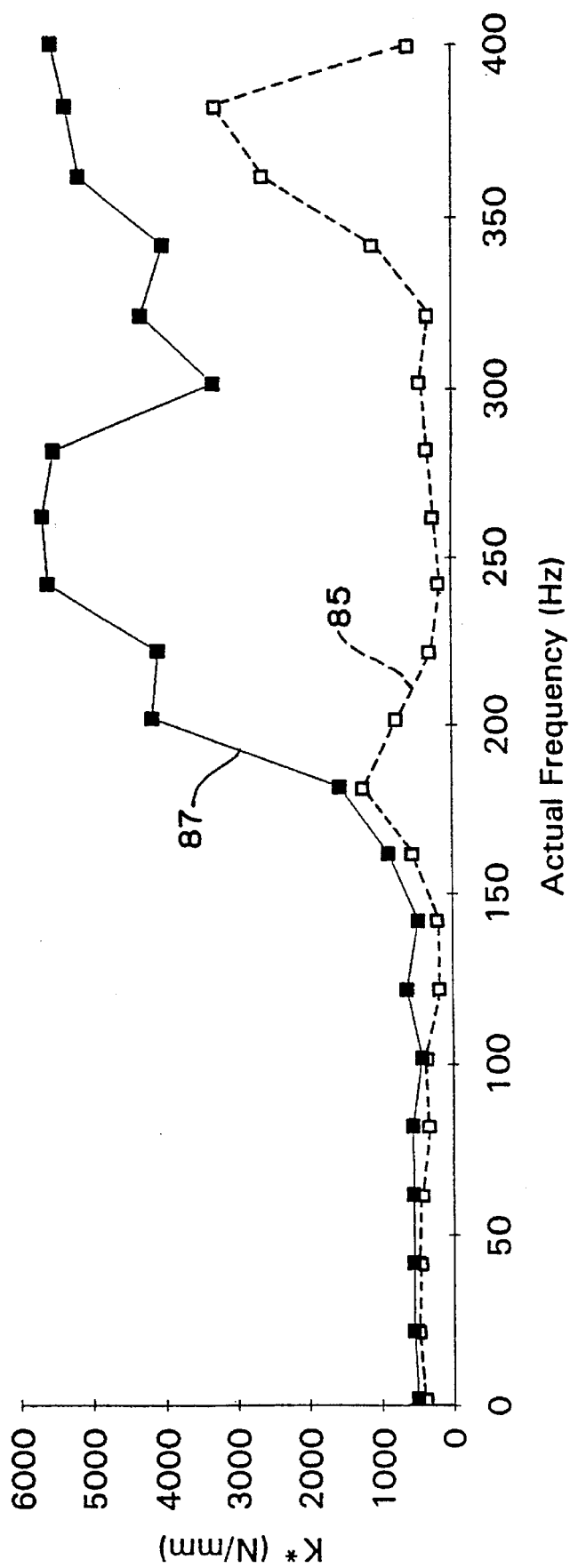
FIG. 3 is a graph of spring rate versus vibration frequency.

FIG. 3 graphs the spring rate K against the frequency of vibration for a diaphragm decoupled mount according to the present invention (curve 85) and for a conventional free floating decoupled mount (curve 87). Curve 85 illustrates the improved high frequency (low amplitude) spring rate characteristics of the diaphragm decoupled mount of the present invention.

What is claimed is:

1. A hydraulic mount comprising:

a partition separating the mount into a first chamber and a second chamber, the partition including a first plate and a second plate wherein the first and second plates each include a primary orifice area with openings and cooperate to define an inertia track of a specified length; and a diaphragm captured between the first and second plates sealing the length of the inertia track and the primary orifice area and having a port opening providing a means of communication between the inertia track and the second chamber, the diaphragm expandably extending across the primary orifice area.

2. A hydraulic mount according to claim 1 wherein the diaphragm is secured to the second plate by an adhesive outside the primary orifice area.

3. A hydraulic mount according to claim 2 wherein the first plate includes a pocket adjacent the diaphragm in the primary orifice area into which the diaphragm is expandable.

4. A hydraulic mount according to claim 1 wherein the second plate is substantially flat adjacent the diaphragm.

5. A hydraulic mount comprising:

a partition separating the mount into a first chamber and a second chamber, the partition including an orifice track of a specified length, the orifice track communicating with both the first chamber and the second chamber, the partition including an internal pocket with a first plurality of openings communicating through the partition between the pocket and the first chamber and a second plurality of openings communicating through the partition between the pocket and the second chamber; and a diaphragm expandably spanning across the pocket and sealing the length of the orifice track, the diaphragm being expandable to permit fluid communication between the first chamber and the pocket and between the second chamber and the pocket wherein the diaphragm prevents fluid communication between the first chamber and the second chamber through the pocket.

\* \* \* \* \*